E. J. KNOWLTON.
Hay-Tedder.

No. 212,388. Patented Feb. 18, 1879.

Witnesses:
Will W. Dodge
Donn P. Twitchell

Inventor:
E. J. Knowlton
By his attys
Dodge & Son

UNITED STATES PATENT OFFICE.

ERNEST J. KNOWLTON, OF ANN ARBOR, MICHIGAN.

IMPROVEMENT IN HAY-TEDDERS.

Specification forming part of Letters Patent No. 212,388, dated February 18, 1879; application filed December 19, 1878.

*To all whom it may concern:*

Be it known that I, ERNEST J. KNOWLTON, of Ann Arbor, in the county of Washtenaw and State of Michigan, have invented certain Improvements in Hay-Tedders, of which the following is a specification:

My invention relates to a tedder in which transverse toothed bars or rake-heads are carried by means of endless chains attached to their ends; and the invention consists in sustaining the chains and heads in a freely-vibrating frame, which admits of the teeth adapting themselves to inequalities in the surface of the ground; in combining with the main toothed bars or rake-heads secondary toothed bars, arranged in such relation thereto that they serve to receive or strip the hay from the main teeth, lift it, and turn it over before it falls to the ground; and in other details, hereinafter explained in full.

Figure 1:
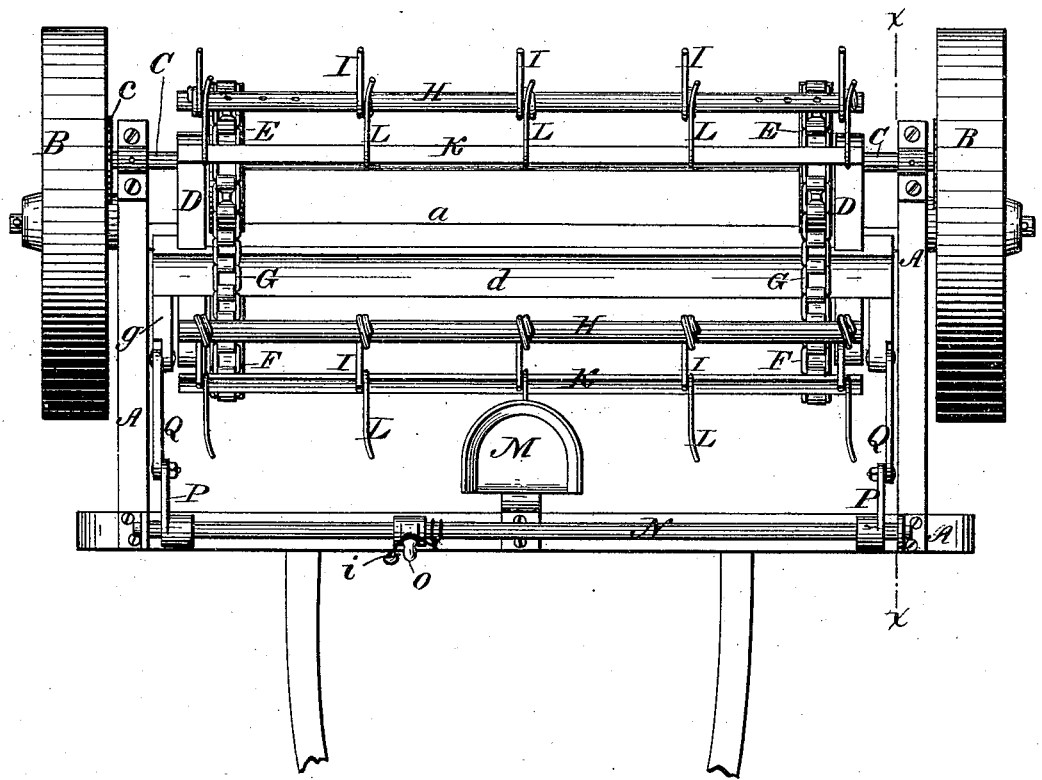
Figure 2:
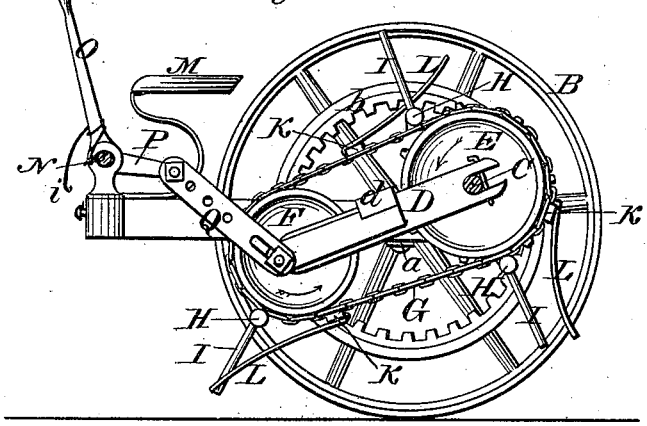

Figure 1 represents a top-plan view of my machine; Fig. 2, a longitudinal vertical section of the same on the line $x\ x$.

A represents a rigid main frame, consisting of two side bars, a front cross-bar, and a rear cross-bar or girt, $a$, all fastened firmly together.

B represents two supporting and driving-wheels, mounted on short axles or journals on the outside of the main frame, and each provided on the inner side with a concentric geared ring, $b$, which may be either cast upon or bolted to the wheels.

C represents a transverse shaft, mounted in bearings on the rear end of the main frame, and provided at its ends with pinions $c$, engaging in the geared rings of the driving-wheels, as shown, the pinions being, in practice, connected with the shaft by a ratchet-clutch or by a pawl-and-ratchet wheel, so that they may turn backward, but not forward, upon the shaft. Upon the shaft C, as an axis, I mount the rear end of a secondary vibrating frame, D, consisting of two longitudinal bars, connected at the middle by a rigid cross-bar, $d$, as shown. On the shaft C, within and at opposite ends of the frame D, I mount two sprocket-wheels, E; and in line with said wheels, at the front vibrating end of frame D, I mount two corresponding wheels, F, which may be sustained, as shown, by short journals on the inside of said frame, or by means of a shaft extending transversely across the same. At each end of the machine, on the two pulleys E F, there located, I mount an endless chain, G, and to these chains I secure the ends of bars H, which extend across the machine from side to side, and which are provided with elastic steel teeth I, as shown. There may be any suitable number of the teeth I on each bar, and any suitable number of the bars, at uniform distances apart. The teeth may be of any suitable form; but it is preferred to have them stand outward at about right angles to the face of the chains, and to coil their ends around the bars which carry them in the manner shown, so that they may possess a high degree of elasticity. Parallel with and in advance of each rake bar or head H there is secured to the chains another bar, K, provided with a series of teeth, L, which are slightly curved, as shown, and arranged to extend backward nearly in line with the chains.

The bars H and K are arranged so near each other, and their fingers or teeth made of such length, that the teeth of the former extend between and across those of the latter, as clearly shown in the drawings, the relative positions of the teeth being changed, however, as the chains bend in passing around the pulleys.

On the front of the main frame there is mounted a driver's seat, M, and also a transverse rock-shaft, N, which latter is provided with a hand-lever, O, and with crank-arms P, which are connected by links Q to forwardly-extending arms on the sides of the vibrating frame D.

The arms $g$, to which the links are attached, extend downward rigidly outside of the frame D from the ends of its cross-bar.

The lower ends of the links are slotted to receive studs on the arms, as shown, so that the frame may vibrate up and down to a limited extent, the links limiting the descent, so as to prevent the teeth from entering or striking violently upon the ground.

As shown in the drawings, the links are provided with a series of holes to receive the pins or pivots which connect them to the crank-arms, so that they may be adjusted to stop the descent of the frame at any required point. By throwing the hand-lever forward the rock-shaft and arms are caused to lift the links and elevate the frame.

In order that the frame may be held in its elevated position, the hand-lever is provided with a spring-catch, $i$, to engage over a stud on the frame.

The operation of the machine is as follows: The frame D being lowered at the front end and the machine carried forward, the rotation of the driving-wheels imparts motion to the pinions $c$, and thence, through the shaft C and wheels or pulleys E, to the chains G, which, in turn, carry the toothed bars or heads H and K around with them. As the bars descend in front of the pulleys F, the teeth of the bars H extend downward in a slightly-inclined position to the ground, and are carried backward and thence upward around the rear pulleys, E, whereby they are caused to catch the hay and carry it backward and upward.

During the backward movement of the rake-teeth the teeth L of the bars K remain turned up out of action between the rake-teeth; but as the latter begin to rise at the rear the teeth L are caused to swing outward between and beyond them in the manner represented in the drawings, so as to throw the hay outward from the rake-teeth, and at the same time turn it over, so that it falls on the ground the opposite side up. By the combined action of the two sets of teeth the hay is thoroughly agitated, loosened up, and inverted.

As the frame which carries the rake-heads is free to vibrate vertically, the teeth of the rake-heads act closely upon and against the surface of the ground, catching and turning all the hay, but at the same time yielding and rising whenever an elevation or obstruction is encountered, so as to prevent breakage of the teeth.

While the construction shown in the drawings is considered the best that can be used, it is manifest that the details may be modified, and that the driving-gear and the form of the rake-teeth may be changed.

The toothed heads, arranged in pairs, with their teeth in different positions and acting in conjunction with one another, may be carried on a reel or frame around a single shaft, instead of being carried by chains, as shown, in which case the front head will be attached loosely and connected with cams or other devices, to impart to it the same rocking or rolling motion that it receives in the machine shown.

The construction of the main frame in the particular manner shown in the drawing is an important feature of my invention, as the use of the transverse bar or brace in the middle of the frame and the leaving of the rear end of the frame open secure the necessary rigidity of the machine, together with a free and unobstructed delivery of the hay at the rear.

I am aware that an endless traveling belt or apron has been provided with teeth arranged to pass forward and upward at the front of the frame, and thence backward on its top, and this I do not claim.

My arrangement of parts to carry the teeth downward and backward is advantageous, in that it causes an easier action and a more thorough agitation of the hay, and also in that it permits the teeth to act directly upon the ground without danger of being broken.

I am aware that a corn harvesting and husking machine has been hitherto proposed in which elevated horizontal aprons were provided with short upright husking-teeth, and with horizontal stripping teeth or plates to remove the adhering husks from the upright teeth, and to such construction and arrangement of parts I lay no claim.

Having thus described my invention, what I claim is—

1. In a hay-tedder, a vertically-vibrating frame provided with endless chains carrying toothed bars or rake-heads, arranged to move downward and backward at the front end of said frame, whereby the rake-teeth are permitted to follow the inequalities of the ground.

2. The combination of the main frame, the internal gravitating frame D, provided with the chains and toothed bars, and the slotted links engaging with and limiting the motion of frame D, as shown.

3. The combination of the main frame, the internal gravitating frame, with its chains and rake-heads, and the rock-shaft, provided with an operating-lever and with crank-arms, connected by links to frame D.

4. In a hay-tedder, the combination of a wheeled frame, an inclined rotary endless apron mounted on rollers therein, upright rake-teeth I, mounted on said apron and acting upon or in close proximity to the ground, and depressed teeth L, also attached to the apron, substantially as shown and described, whereby the teeth I are caused to lift the hay from the ground and carry it backward and upward, and the teeth L caused to throw it backward and upward from teeth I with a scattering and turning action.

5. In a hay-tedder, the combination of two adjacent toothed heads, one arranged to catch the hay and carry it backward and upward, and the other having an independent rolling motion, so as to receive the hay from the first teeth and roll it backward in a reversed position, as set forth.

6. In combination with the vibrating frame D, having the chains and rake-heads mounted therein, the main frame provided with the supporting-wheels, and the transverse bar $a$, located as shown, and having the open rear end.

ERNEST J. KNOWLTON.

Witnesses:
J. H. MORRIS,
JOHN N. GOTT.